United States Patent
Huang et al.

(10) Patent No.: US 12,255,693 B2
(45) Date of Patent: *Mar. 18, 2025

(54) SIGNAL MEASUREMENT METHOD AND COMMUNICATION APPARATUS

(71) Applicant: HUAWEI TECHNOLOGIES CO., LTD., Shenzhen (CN)

(72) Inventors: Su Huang, Shanghai (CN); Lei Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,442

(22) Filed: Apr. 17, 2023

(65) Prior Publication Data
US 2023/0327785 A1    Oct. 12, 2023

Related U.S. Application Data

(63) Continuation of application No. 17/401,593, filed on Aug. 13, 2021, now Pat. No. 11,658,753, which is a
(Continued)

(30) Foreign Application Priority Data

Feb. 15, 2019    (CN) .......................... 201910118107.9

(51) Int. Cl.
*H04B 17/327* (2015.01)
*H04B 7/0426* (2017.01)
(Continued)

(52) U.S. Cl.
CPC ........... *H04B 17/27* (2015.01); *H04B 7/0426* (2013.01); *H04B 17/327* (2015.01); *H04W 64/003* (2013.01)

(58) Field of Classification Search
CPC .... H04B 17/27; H04B 7/0426; H04B 17/327; H04B 7/0695; H04W 64/003;
(Continued)

(56) References Cited

U.S. PATENT DOCUMENTS

| | | | |
|---|---|---|---|
| 11,658,753 B2 * | 5/2023 | Huang | ...................... G01S 1/08 |
| | | | 455/456.1 |
| 2015/0003359 A1 * | 1/2015 | Hoshino | ............... H04W 72/21 |
| | | | 370/329 |

(Continued)

FOREIGN PATENT DOCUMENTS

| | | |
|---|---|---|
| CN | 102045838 A | 5/2011 |
| CN | 105589506 A | 5/2016 |

(Continued)

OTHER PUBLICATIONS

Huawei et al. "Considerations on NR Positioning." 3GPP TSG RAN WG1 Meeting #94, Gothenburg, Sweden. Aug. 20-24, 2018. R1-1809348. 9 pages.
(Continued)

*Primary Examiner* — Kenneth T Lam
(74) *Attorney, Agent, or Firm* — Maier & Maier, PLLC

(57) ABSTRACT

This application provides a signal measurement method and a communication apparatus, to measure a downlink angle of departure (DAOD) more accurately. The method includes: receiving resource configuration information, where the resource configuration information includes configuration information of a first reference signal set, the first reference signal set includes M reference signals, N reference signals in the M reference signals are reference reference signals, M is greater than 1, and N is greater than or equal to 1; receiving the M reference signals; determining N first paths corresponding to the N reference reference signals, and separately determining M*N received powers of the M reference signals on the N first paths; and reporting a measurement result, where the measurement result includes K*N received powers in M*N received powers, K≤M, and the first path is one of a plurality of paths corresponding to a reference reference signal.

20 Claims, 7 Drawing Sheets

Related U.S. Application Data continuation of application No. PCT/CN2020/074889, filed on Feb. 12, 2020.

(51) Int. Cl.
*H04B 17/27* (2015.01)
*H04W 64/00* (2009.01)

(58) Field of Classification Search
CPC ..... H04W 64/00; H04W 24/08; H04W 24/10; H04W 64/006; H04W 72/23; G01S 1/08; G01S 5/0236; G01S 5/0218; G01S 5/0036; H04L 25/0224; H04L 5/0048; H04L 5/0094
See application file for complete search history.

(56) References Cited

U.S. PATENT DOCUMENTS

| | | | | |
|---|---|---|---|---|
| 2016/0105265 | A1* | 4/2016 | Wang | H04L 5/0048 370/252 |
| 2017/0026938 | A1* | 1/2017 | Onggosanusi | H04W 24/10 |
| 2019/0110210 | A1* | 4/2019 | Takeda | H04B 7/06 |
| 2020/0059290 | A1* | 2/2020 | Pan | H04W 24/10 |
| 2020/0067590 | A1* | 2/2020 | Wang | H04B 7/0868 |
| 2020/0145977 | A1* | 5/2020 | Kumar | H04W 56/001 |
| 2020/0220631 | A1* | 7/2020 | Onggosanusi | H04B 17/327 |
| 2020/0267684 | A1* | 8/2020 | Huang | H04L 5/0051 |
| 2020/0403673 | A1* | 12/2020 | Bontu | H04L 25/03343 |
| 2022/0113365 | A1* | 4/2022 | Sosnin | H04W 64/00 |

FOREIGN PATENT DOCUMENTS

| | | |
|---|---|---|
| CN | 107852630 A | 3/2018 |
| CN | 108023631 A | 5/2018 |
| CN | 108064056 A | 5/2018 |
| CN | 108111286 A | 6/2018 |
| CN | 108886398 A | 11/2018 |
| WO | 2020028517 A1 | 2/2020 |

OTHER PUBLICATIONS

Intel Corporation, Techniques for NR Positioning. 3GPP TSG RAN WG1 Meeting #94bis, Chengdu, China, Oct. 8-12, 2018, R1-1810801, 12 pages.

Polaris Wireless, NR Angle Based DL Positioning. 3GPP TSG RAN WGI-AH-1901, Taipei, Taiwan, Jan. 21-25, 2019, R1-1900781, 6 pages.

* cited by examiner

SIGNAL MEASUREMENT METHOD AND COMMUNICATION APPARATUS

CROSS-REFERENCE TO RELATED APPLICATIONS

This application is a continuation of U.S. patent application Ser. No. 17/401,593, filed on Aug. 13, 2021, which is a continuation of International Application No. PCT/CN2020/074889, filed on Feb. 12, 2020, which claims priority to Chinese Patent Application No. 201910118107.9, filed on Feb. 15, 2019. All of the afore-mentioned patent applications are hereby incorporated by reference in their entireties.

TECHNICAL FIELD

The embodiments relate to the communications field, and more specifically, to a signal measurement method and a communication apparatus.

BACKGROUND

A downlink angle of departure (DAOD) is defined as a direction of departure of an electromagnetic wave observed from an access network device during downlink electromagnetic wave transmission between the access network device and a terminal device. The access network device sends a plurality of signals in different beam directions to the terminal device. The terminal device receives and measures received powers of the plurality of signals in the different beam directions, and may determine a DAOD of a channel between the access network device and the terminal device by using a beam direction corresponding to each signal and a proportion relationship between the received powers of the signals in the different beam directions.

However, in the foregoing method, because the measured received powers include received powers of a plurality of paths, the measured DAOD may be inaccurate. How to measure the DAOD more accurately is a problem that needs to be solved.

SUMMARY

The embodiments provide a signal measurement method and a communication apparatus, to measure a DAOD more accurately.

According to a first aspect, a signal measurement method is provided. The method may be implemented by a terminal device or may be implemented by a chip disposed in the terminal device. This is not limited in the embodiments. The following describes the method by using an example in which the method is implemented by the terminal device.

The method includes: receiving resource configuration information, where the resource configuration information includes configuration information of a first reference signal set, the first reference signal set includes M reference signals, N reference signals in the M reference signals are reference reference signals, M is an integer greater than 1, and N is an integer greater than or equal to 1; receiving the M reference signals; determining N first paths corresponding to the N reference reference signals, and determining M*N received powers of the M reference signals on the N first paths; and reporting a measurement result, where the measurement result includes K*N received powers in M*N received powers, and K≤M.

Optionally, the received power included in the measurement result may be an absolute received power or may be a relative received power. The absolute received power is a received power actually measured, and the relative received power is a received power of another reference signal relative to a reference signal determined to be a reference signal whose received power is used as a reference. For example, an absolute received power and a relative received power of a reference signal #i in the first reference signal set are respectively denoted as $P_{1,i}$ and $P_{1,i}'$, where i=1, 2, . . . , and M. In this case, it may be considered that $$P_{1,1}' = 1, P_{1,k}' = \frac{P_{1,k}}{P_{1,1}}, \text{ or } P_{1,k}' = 10 \times \log_{10} \frac{P_{1,k}}{P_{1,1}},$$

where k=2, 3, . . . , and M. $P_{1,1}'$ may not be reported, but this is not limited in the embodiments.

According to the signal measurement method provided in the embodiments, the terminal device reports received powers on a same path, so that a positioning device can obtain a more accurate DAOD based on the received powers on the same path. For example, the positioning device may match the received powers on the same path that are reported by the terminal device, with received powers that correspond to a plurality of beams at different exit angles and that are measured in advance by an access network device under a relatively ideal condition. Because under the relatively ideal condition, multipath generally does not exist, a matching result is more accurate, so that the positioning device can obtain a more accurate DAOD.

With reference to the first aspect, in some implementations of the first aspect, the N reference reference signals are configured by the positioning device or selected by the terminal device from the M reference signals.

When selecting the reference reference signals from the first reference signal set, the terminal device may select, based on a reference signal received power (RSRP) corresponding to each reference signal in the first reference signal set, one or more reference signals with a largest RSRP as the reference reference signals. Alternatively, the terminal device may select one or more reference signals with a shortest delay as the reference reference signals. Alternatively, the terminal device may select the reference reference signals according to another criterion. This is not limited in the embodiments. In addition, a quantity or a maximum quantity of reference reference signals in one reference signal set may be configured by the positioning device, for example, configured by using the resource configuration information, or may be specified by a protocol or preconfigured.

Based on the foregoing solution, the positioning device may flexibly configure the reference reference signals, or the terminal device may flexibly select the reference reference signals.

With reference to the first aspect, in some implementations of the first aspect, the N reference reference signals correspond to N spatial receive filters; and M received powers of the M reference signals on any first path j in the N first paths are M received powers, on the first path j, of the M reference signals received by using a spatial receive filter corresponding to a reference reference signal corresponding to the first path j.

Received powers of reference signals received based on a same spatial receive filter on the first path are reported, so that the positioning device can more accurately estimate the DAOD.

Further, each of the spatial receive filters is a spatial receive filter that is in a plurality of spatial receive filters and that maximizes a received power of a reference reference signal corresponding to the spatial receive filter.

That is, a spatial receive filter corresponding to one reference reference signal is a spatial receive filter that is in a plurality of spatial receive filters and that maximizes a received power corresponding to the reference reference signal.

The reference reference signal is received by using the spatial receive filter that maximizes the received power corresponding to the reference reference signal, so that a path determined based on the reference reference signal is more accurate, and correspondingly, a received power on the path is also more accurate.

In addition, the measurement result may further include identification information of the N spatial receive filters corresponding to the N reference reference signals.

With reference to the first aspect, in some implementations of the first aspect, the K*N received powers include K largest received powers in M received powers on each first path in the N first paths, and K<M.

Further, the measurement result further includes identification information of K*N reference signals corresponding to the K*N received powers.

The K largest received powers in the M received powers on each first path in the N first paths are reported, so that signaling overheads can be reduced without loss of DAOD estimation precision.

With reference to the first aspect, in some possible implementations of the first aspect, the resource configuration information further includes configuration information of a second reference signal set, the second reference signal set includes P reference signals, Q reference signals in the P reference signals are reference reference signals, P is an integer greater than 1, and Q is an integer greater than or equal to 1;

the measurement result further includes some or all of P*Q received powers; and the method further includes:

receiving the P reference signals; and determining Q first paths corresponding to the Q reference reference signals, and determining the P*Q received powers of the P reference signals on the Q first paths.

Optionally, the first reference signal set and the second reference signal set may correspond to different cells. This is not limited in this embodiment.

Based on the foregoing solution, the terminal device not only reports received powers of the reference signals in the first reference signal set on a same path, but also reports received powers of the reference signals in the second reference signal set on a same path. When a cell corresponding to the first reference signal set and a cell corresponding to the second reference signal set correspond to different access network devices, the positioning device may obtain DAODs of more access network devices. Further, a location of the terminal device can be determined based on DAODs of a plurality of access network devices.

With reference to the first aspect, in some implementations of the first aspect, each first path is a path with a largest received power in a plurality of paths that correspond to a reference reference signal corresponding to the first path.

Selecting the first path according to the above criteria helps estimate a DAOD of a reflection path. If the path with the largest received power is not selected but the $1^{st}$ path is selected, the DAOD of the reflection path can never be selected. Therefore, the largest path is selected.

With reference to the first aspect, in some implementations of the first aspect, the measurement result further includes delays of N−1 first paths, in the N first paths except a reference first path, relative to the reference first path, where N is greater than 1.

The terminal device reports a delay difference between a plurality of paths, so that the positioning device can locate the terminal device based on the DAOD, received powers corresponding to the plurality of paths, and the delay difference.

According to a second aspect, a signal measurement method is provided. The method may be implemented by a positioning device or may be implemented by a chip disposed in the positioning device. This is not limited in the embodiments. The following describes the method by using an example in which the method is implemented by the positioning device.

The method includes: sending resource configuration information, where the resource configuration information includes configuration information of a first reference signal set, the first reference signal set includes M reference signals, N reference signals in the M reference signals are reference reference signals, M is an integer greater than 1, and N is an integer greater than or equal to 1;

receiving a measurement result, where the measurement result includes K*N received powers in M*N received powers of the M reference signals on N first paths, the N first paths correspond to the N reference reference signals, and K≤M; and determining a downlink angle of departure (DAOD) based on the measurement result.

Optionally, the received power included in the measurement result may be an absolute received power, or may be a relative received power. The absolute received power is a received power actually measured, and the relative received power is a received power of another reference signal relative to a reference signal determined to be a reference reference signal whose received power is used as a reference. For example, an absolute received power and a relative received power of a reference signal #i in the first reference signal set are respectively denoted as $P_{1,i}$ and $P_{1,i}'$ where i=1, 2, . . . , and M. In this case, it may be considered that $$P'_{1,1} = 1, P'_{1,k} = \frac{P_{1,k}}{P_{1,1}}, \text{ or } P'_{1,k} = 10 \times \log_{10} \frac{P_{1,k}}{P_{1,1}},$$

where k=2, 3, . . . , and M. $P_{1,1}'$ may not be reported, but this is not limited in the embodiments.

According to the signal measurement method provided in the embodiments, a terminal device reports received powers on a same path, so that the positioning device can obtain a more accurate DAOD based on the received powers on the same path. For example, the positioning device may match the received powers on the same path that are reported by the terminal device, with received powers that correspond to a plurality of beams at different exit angles and that are measured in advance by an access network device under a relatively ideal condition. Because under the relatively ideal condition, multipath generally does not exist, a matching result is more accurate, so that the positioning device can obtain a more accurate DAOD.

With reference to the second aspect, in some implementations of the second aspect, the N reference reference signals are configured by the positioning device, or selected by the terminal device from the M reference signals.

When selecting the reference reference signals from the first reference signal set, the terminal device may select, based on an RSRP corresponding to each reference signal in the first reference signal set, one or more reference signals with a largest RSRP as the reference reference signals. Alternatively, the terminal device may select one or more reference signals with a shortest delay as the reference reference signals. Alternatively, the terminal device may select the reference reference signals according to another criterion. This is not limited in the embodiments. In addition, a quantity or a maximum quantity of reference reference signals in one reference signal set may be configured by the positioning device, for example, configured by using the resource configuration information, or may be specified by a protocol or preconfigured.

Based on the foregoing solution, the positioning device may flexibly configure the reference reference signals, or the terminal device may flexibly select the reference reference signals.

With reference to the second aspect, in some implementations of the second aspect, the N reference reference signals correspond to N spatial receive filters; and M received powers of the M reference signals on any first path j in the N first paths are M received powers, on the first path j, of the M reference signals received by using a spatial receive filter corresponding to a reference reference signal corresponding to the first path j.

The positioning device performs DAOD estimation based on the received powers of the reference signals received based on the same spatial receive filter on the first path, so that a more accurate DAOD may be obtained.

Further, each of the spatial receive filters is a spatial receive filter that is in a plurality of spatial receive filters and that maximizes a received power of a reference reference signal corresponding to the spatial receive filter.

That is, a spatial receive filter corresponding to one reference reference signal is a spatial receive filter that is in a plurality of spatial receive filters and that maximizes a received power corresponding to the reference reference signal.

The reference reference signal is received by using the spatial receive filter that maximizes the received power corresponding to the reference reference signal, so that a path determined based on the reference reference signal is more accurate, and correspondingly, a received power on the path is also more accurate.

In addition, the measurement result may further include identification information of the N spatial receive filters corresponding to the N reference reference signals.

With reference to the second aspect, in some implementations of the second aspect, the K*N received powers include K largest received powers in M received powers on each first path in the N first paths, and K<M.

Further, the measurement result further includes identification information of K*N reference signals corresponding to the K*N received powers.

The K largest received powers in the M received powers on each first path in the N first paths are reported, so that signaling overheads can be reduced without loss of DAOD estimation precision.

With reference to the second aspect, in some possible implementations of the second aspect, the resource configuration information further includes configuration information of a second reference signal set, the second reference signal set includes P reference signals, Q reference signals in the P reference signals are reference reference signals, P is an integer greater than 1, and Q is an integer greater than or equal to 1; and the measurement result further includes some or all of P*Q received powers of the P reference signals on Q first paths, and the Q first paths correspond to the Q reference reference signals.

Optionally, the first reference signal set and the second reference signal set may correspond to different cells. This is not limited in this embodiment.

Based on the foregoing solution, the terminal device not only reports received powers of the reference signals in the first reference signal set on a same path, but also reports received powers of the reference signals in the second reference signal set on a same path. When a cell corresponding to the first reference signal set and a cell corresponding to the second reference signal set correspond to different access network devices, the positioning device may obtain DAODs of more access network devices. Further, a location of the terminal device can be determined based on DAODs of a plurality of access network devices.

With reference to the second aspect, in some implementations of the second aspect, each first path is a path with a largest received power in a plurality of paths that correspond to a reference reference signal corresponding to the first path.

Selecting the first path according to the above criteria helps estimate a DAOD of a reflection path. If the path with the largest received power is not selected but the $1^{st}$ path is selected, a DAOD of the reflection path can never be selected. Therefore, the largest path is selected.

With reference to the second aspect, in some implementations of the second aspect, the measurement result further includes delays of N−1 first paths, in the N first paths except a reference first path, relative to the reference first path, where N is greater than 1.

The positioning device may locate the terminal device based on the DAOD, received powers corresponding to the plurality of paths, and the delay difference.

According to a third aspect, a signal measurement method is provided. The method may be implemented by an access network device, or may be implemented by a chip disposed in the access network device. This is not limited in the embodiments. The following describes the method by using an example in which the method is implemented by the access network device.

The method includes: sending configuration information of a first reference signal set, where the first reference signal set includes M reference signals, N reference signals in the M reference signals are reference reference signals, M is an integer greater than 1, and N is an integer greater than or equal to 1; and sending the M reference signals.

According to the signal measurement method provided in the embodiments, the access network device configures the first reference signal set, so that a terminal device can report received powers on a same path by measuring the reference signals in the first reference signal set, and a positioning device can obtain a more accurate DAOD based on the received powers on the same path.

With reference to the third aspect, in some implementations of the third aspect, the method further includes: receiving a request message, where the sending configuration information of a first reference signal set includes: sending the configuration information of the first reference signal set based on the request message.

In other words, the access network device may configure the first reference signal set based on a request of the positioning device.

With reference to the third aspect, in some implementations of the third aspect, the method further includes:
receiving K*N received powers in M*N received powers of the M reference signals on N first paths, where the N first paths correspond to the N reference reference signals, and K≤M; and
determining a downlink angle of departure (DAOD) based on the K*N received powers.

According to the signal measurement method provided in the embodiments, the access network device can obtain a more accurate DAOD based on the received powers on the same path sent by the positioning device or the terminal device. For example, the access network device may match the received powers on the same path that are sent by the positioning device or the terminal device, with received powers that correspond to a plurality of beams at different exit angles and that are measured in advance by an access network device under a relatively ideal condition. Because under the relatively ideal condition, multipath generally does not exist, a matching result is more accurate, so that a more accurate DAOD is obtained.

With reference to the third aspect, in some implementations of the third aspect, the method further includes: sending information for indicating the DAOD.

The access network device sends, to the positioning device, the information indicating the DAOD, so that the positioning device may determine the DAOD between the terminal device and the access network device.

According to a fourth aspect, a communication apparatus is provided. The communication apparatus includes each module or unit configured to perform the method in any one of the first aspect and the possible implementations of the first aspect.

According to a fifth aspect, a communication apparatus is provided, and includes a processor. The processor is coupled to a memory and may be configured to execute instructions in the memory, to implement the method in any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a sixth aspect, a communication apparatus is provided. The communication apparatus includes each module or unit configured to perform the method in any one of the second aspect and the possible implementations of the second aspect.

According to a seventh aspect, a communication apparatus is provided, and includes a processor. The processor is coupled to a memory and may be configured to execute instructions in the memory, to implement the method in any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a positioning device. When the communication apparatus is the positioning device, the communication interface may be a transceiver or an input/output interface.

In another implementation, the communication apparatus is a chip disposed in a positioning device. When the communication apparatus is the chip disposed in the positioning device, the communication interface may be an input/output interface.

Optionally, the transceiver may be a transceiver circuit. Optionally, the input/output interface may be an input/output circuit.

According to an eighth aspect, a communication apparatus is provided. The communication apparatus includes each module or unit configured to perform the method in any one of the third aspect and the possible implementations of the third aspect.

According to a ninth aspect, a communication apparatus is provided, and includes a processor. The processor is coupled to a memory and may be configured to execute instructions in the memory, to implement the method in any one of the third aspect and the possible implementations of the third aspect. Optionally, the communication apparatus further includes the memory. Optionally, the communication apparatus further includes a communication interface, and the processor is coupled to the communication interface.

In an implementation, the communication apparatus is a positioning device. When the communication apparatus is the positioning device, the communication interface may be a transceiver or an input/output interface.

In another implementation, the communication apparatus is a chip disposed in a positioning device. When the communication apparatus is the chip disposed in the positioning device, the communication interface may be an input/output interface.

Optionally, the transceiver may be a transceiver circuit. Optionally, the input/output interface may be an input/output circuit.

According to a tenth aspect, a processor is provided, and includes an input circuit, an output circuit, and a processing circuit. The processing circuit is configured to: receive a signal by using the input circuit, and transmit a signal by using the output circuit, so that the processor performs the method in any one of the first aspect to the third aspect and the possible implementations of the first aspect to the third aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment.

According to an eleventh aspect, a computer program product is provided. The computer program product includes a computer program (also referred to as code or instructions). When the computer program is run, a computer is enabled to perform the method according to any one of the first aspect to the third aspect and the possible implementations of the first aspect to the third aspect.

According to a twelfth aspect, a computer-readable medium is provided. The computer-readable medium stores a computer program (also referred to as code or instructions). When the computer program is run on a computer, the computer is enabled to perform the method according to any one of the first aspect to the third aspect and the possible implementations of the first aspect to the third aspect.

According to a thirteenth aspect, a communication system is provided, and includes the foregoing positioning device, the foregoing terminal device and the foregoing access network device.

DETAILED DESCRIPTION OF THE EMBODIMENTS

Figure 1:
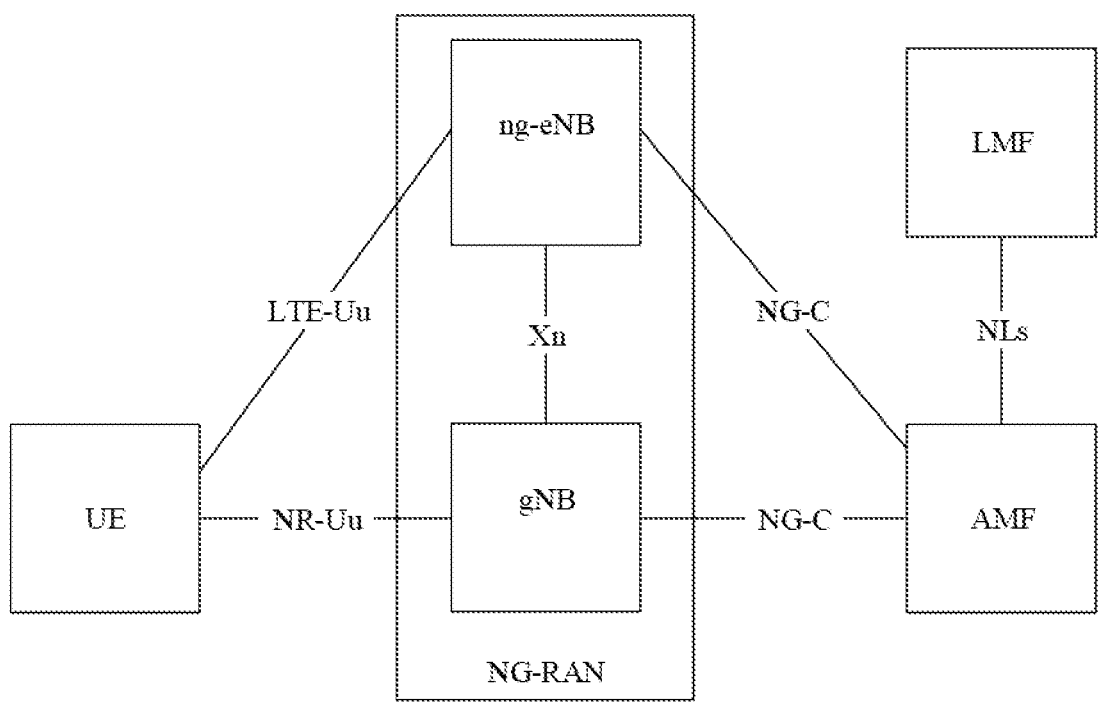
FIG. 1 is a schematic diagram of a communication system applied to the embodiments.

The following describes solutions of the embodiments with reference to the accompanying drawings.

The solutions in embodiments may be applied to various communication systems such as a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) communication system, or a new radio access technology (NR).

A positioning device in the embodiments may be an apparatus or a component that provides a positioning function for a terminal device. For example, the positioning device may be a location management function (LMF) or a location management component (LMC). The LMC may be integrated into an access network device on a next-generation radio access network (NG-RAN) side. Therefore, the positioning device may be an access network device integrated with the LMC. In the embodiments, an access network device is an apparatus that is deployed in a radio access network to provide a wireless communication function for a terminal device. The access network device includes but is not limited to an evolved NodeB (eNB), a radio network controller (RNC), a NodeB (NB), a base station controller (BSC), a base transceiver station (BTS), a home base station (for example, a home evolved NodeB, or a home Node B (HNB)), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system, one antenna panel or a group of antenna panels (including a plurality of antenna panels) of a gNodeB in a 5G system, or a network node, such as a baseband unit (BBU) or a distributed unit (DU), that constitutes a gNB or a transmission point. Alternatively, the access network device may be a radio controller in a cloud radio access network (CRAN) scenario. The access network device may alternatively be a wearable device, a vehicle-mounted device, or the like.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling is sent by the DU or is sent by the DU and the CU. It may be understood that the access network device may be a CU node, a DU node, or a device including a CU node and a DU node.

A terminal device in the embodiments may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments may be a mobile phone, a tablet computer, a computer having wireless sending and receiving functions, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments.

FIG. 1 is a schematic architectural diagram of a communication system applied to an embodiment of the embodiments. As shown in FIG. 1, in the system, terminal devices (UE is used as an example) are connected to a radio access network through an LTE-Uu interface and/or an NR-Uu interface via a next-generation eNodeB (ng-eNB) and a gNB. The radio access network is connected to a core network through an NG-C interface via an access and mobility management function (AMF). A next-generation radio access network (NG-RAN) includes one or more ng-eNBs. The NG-RAN may also include one or more gNBs. The NG-RAN may alternatively include one or more ng-eNBs and gNBs. The ng-eNB is an LTE base station that accesses a 5G core network, and the gNB is a 5G base station that accesses a 5G core network. The core network includes functions such as the AMF and a location management function (LMF). The AMF is configured to implement functions such as access management, and the LMF is configured to implement functions such as positioning. The AMF and the LMF are connected through an NLs interface. The LMF is an apparatus or a component deployed in the core network to provide the positioning function for the UE.

Figure 2:
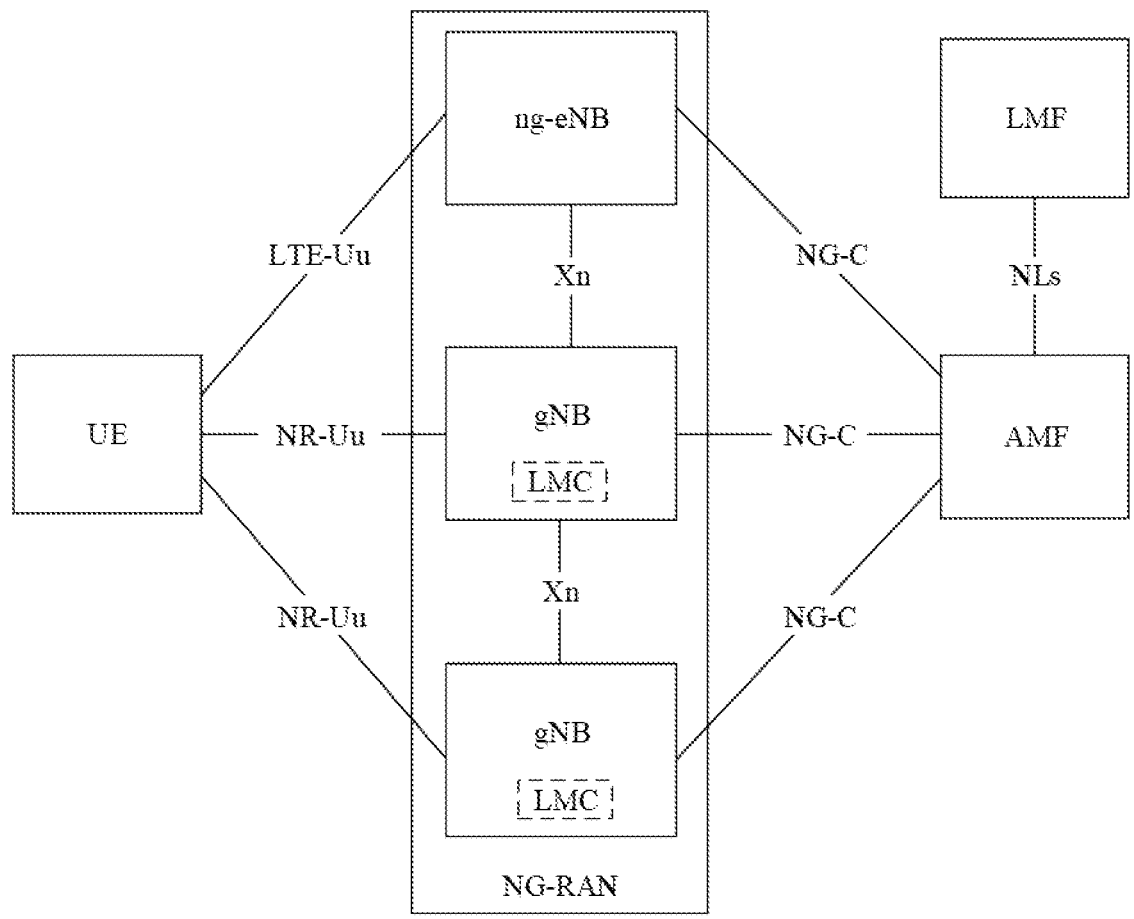
FIG. 2 is a schematic diagram of another communication system applied to the embodiments.

FIG. 2 is a schematic architectural diagram of another communication system for signal transmission applied to an embodiment of the embodiments. A difference between the system architectures in FIG. 1 and FIG. 2 lies in that a location management function apparatus or component (for example, an LMF) in FIG. 1 is deployed in the core network, and a location management function apparatus or component in FIG. 2 (for example, a location management component (LMC)) may be deployed in a base station. As shown in FIG. 2, the gNB includes the LMC. The LMC is a functional component of the LMF and may be integrated into a gNB on an NG-RAN side.

It should be understood that the system in FIG. 1 or FIG. 2 may include one or more gNBs, and a single or a plurality of terminal devices. A single gNB may transmit data or control signaling to a single terminal device or a plurality of terminal devices. A plurality of gNBs may simultaneously transmit data or control signaling to one terminal device.

It should be further understood that the device or the function node included in the system in FIG. 1 or FIG. 2 is merely described as an example and does not constitute a limitation on the embodiments. In practice, the system in FIG. 1 or FIG. 2 may further include another network element, device or function node that has an interaction relationship with the device or function node shown in the figure. This is not limited herein.

Figure 3:
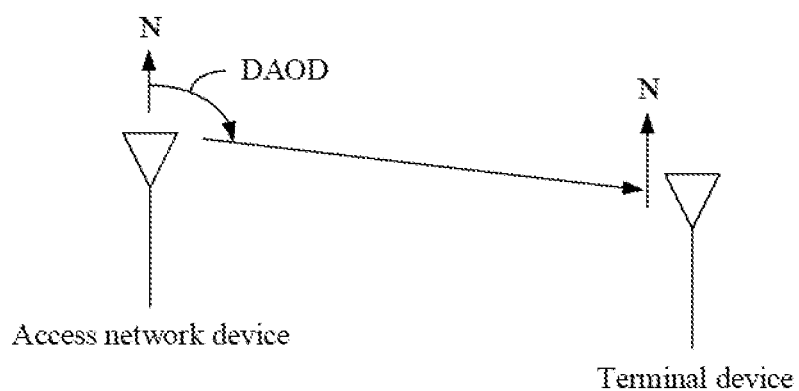
FIG. 3 shows a definition of a DAOD.

As shown in FIG. 3, a direction of departure of an electromagnetic wave observed from an access network device during downlink electromagnetic wave transmission between an access network device and a terminal device is defined as a downlink angle of departure (DAOD). A technology for determining a DAOD by measuring reference signal received powers (RSRP) of a plurality of signals in different beam directions is known. For example, the access network device sends the plurality of reference signals to the terminal device, where each reference signal corresponds to one transmit beam, and the terminal device measures and reports the RSRPs corresponding to the plurality of reference signals. The DAOD may be determined based on a direction of a transmit beam corresponding to each reference signal and a proportion relationship between the plurality of RSRPs corresponding to the plurality of reference signals. It should be understood that the RSRP corresponding to the reference signal may also be referred to as an RSRP of a beam corresponding to the reference signal.

Figure 4:
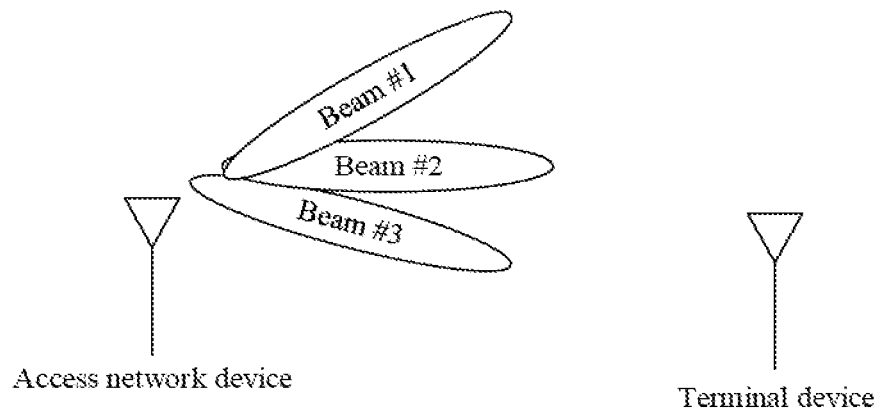
FIG. 4 is a schematic diagram of sending a reference signal by an access network device.

The following describes, by using an example in which the access network device sends three reference signals, the foregoing method for measuring a DAOD. Referring to FIG. 4, transmit beams corresponding to the three reference signals sent by the access network device are a beam #1, a beam #2, and a beam #3. The terminal device measures RSRPs of the three beams and feeds back a measurement result to the access network device or the positioning device. Because the beam #1 is not aimed at the terminal device, the measured RSRP of the beam #1 is the lowest. The beam #2 is aimed at the terminal device to some extent, and therefore the measured RSRP of the beam #2 is higher. The beam #3 is aimed at the terminal device to the largest extent among the three beams, and therefore the measured RSRP is the highest. After obtaining the measurement result, the access network device or the positioning device matches the measurement result with RSRPs that correspond to a plurality of beams at different exit angles and that are measured in advance under a relatively ideal condition, and finds that a proportion relationship between the RSRPs corresponding to the beam #1, the beam #2, and the beam #3 better matches a pre-measured proportion relationship between three beams when the terminal device is in a direction of 30 degrees, and determines that the terminal device is in the direction of 30 degrees.

According to a definition of an RSRP, the RSRP includes a power of an entire channel, that is, the RSRP is a sum of received powers on a plurality of paths of the channel. However, RSRPs that correspond to a plurality of beams at different exit angles and that are measured under an ideal condition are obtained based on a single path. Therefore, during RSRP matching, a result may be inaccurate, and an obtained DAOD may be inaccurate.

Based on this, the embodiments provides a signal measurement method, where a terminal device reports received powers on a same path, so that a positioning device can obtain a more accurate DAOD based on the received powers on the same path.

Before the embodiments are described, several terms used in the embodiments are first described briefly.

1. Beam

The beam may be a spatial domain filter that is also referred to as a spatial filter or a spatial parameter. A beam used to send a signal may be referred to as a transmission beam (Tx beam) or may be referred to as a spatial domain transmission filter or a spatial domain transmission parameter. A beam used to receive a signal may be referred to as a reception beam (Rx beam) or may be referred to as a spatial domain receive filter or a spatial reception parameter.

The transmission beam may refer to distribution of signal strength formed in different directions in space after a signal is transmitted by using an antenna, and the reception beam may refer to distribution of signal strength that is of a radio signal received from an antenna and that is in different directions in space.

In addition, the beam may be a wide beam, a narrow beam, or a beam of another type. A technology for forming the beam may be a beamforming technology or another technology. The beamforming technology may be a digital beamforming technology, an analog beamforming technology, a hybrid digital/analog beamforming technology, or the like Optionally, a plurality of beams having a same or similar communication feature may be considered as one beam. One beam may include one or more antenna ports, configured to transmit a data channel, a control channel, a sounding signal, and the like. The one or more antenna ports forming the beam may also be considered as one antenna port set.

2. Reference Signal and Reference Signal Resource

The reference signal may be used for beam measurement, for example, beam quality information is obtained by measuring the reference signal. A parameter used to measure beam quality includes, but is not limited to, an RSRP. For example, beam quality may also be measured by using parameters such as reference signal received quality (RSRQ), a signal-to-noise ratio (SNR), and signal to interference plus noise ratio (SINR).

A resource of the reference signal may be used to configure transmission attributes, for example, a time-frequency resource position, a port mapping relationship, a power factor, and a scrambling code, of the reference signal. For details, refer to a current technology. The access network device may send the reference signal based on the reference signal resource, and the terminal device may receive the reference signal based on the reference signal resource.

The reference signal in the embodiments may include, for example, a channel state information reference signal (CSI-RS), a synchronization signal block (SSB), and a sounding reference signal (SRS). Correspondingly, the resource of the reference signal may include a CSI-RS resource, an SSB resource, or an SRS resource.

It should be noted that the SSB may also be referred to as a synchronization signal/physical broadcast channel block (SS/PBCH block), and the corresponding SSB resource may also be referred to as a synchronization signal/physical broadcast channel block resource (SS/PBCH block resource) that may be briefly referred to as an SSB resource. In some cases, the SSB may also refer to the SSB resource. In the embodiments, the SSB may be considered as the SS/PBCH block, and the SSB resource may be considered as the SS/PBCH block resource.

To distinguish between different reference signal resources, each reference signal resource may correspond to one reference signal resource identifier, for example, a CSI-RS resource identifier (CRI), an SSB resource identifier (SSBRI), or an SRS resource index (SRI). The SSB resource identifier may also be referred to as an SSB index.

It should be understood that the reference signals and the corresponding reference signal resources enumerated above are merely examples for description and shall not constitute any limitation on the embodiments. the embodiments does not exclude a possibility of defining another reference signal in a future protocol to implement a same or similar function.

It should be understood that configuring a reference signal by the positioning device in the embodiments may be understood as configuring a reference signal resource by the positioning device.

The following describes in detail the signal measurement method and apparatus provided in the embodiments with reference to the accompanying drawings.

It should be understood that in the following embodiments, terms such as "first" and "second" are merely intended to distinguish between different objects, and do not constitute any limitation on the embodiments. For example, different reference signal sets and different paths are distinguished.

It should be further understood that the "protocol" in the embodiments may be a standard protocol in the communications field, and for example, may include an LTE protocol, an NR protocol, and a related protocol used in a future communication system. This is not limited in the embodiments.

It should be further understood that the term "and/or" describes an association relationship between associated objects and represents that three relationships may exist. For example, A and/or B may represent the following three cases: only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

The solutions in the embodiments may be used in a wireless communication system, for example, the communication system shown in FIG. 1, or the communication system shown in FIG. 2. When the solutions are used in the system shown in FIG. 1, the positioning device in the embodiments may be the LMF in the system shown in FIG. 1, the access network device may be an ng-eNB or gNB, and the terminal device may be UE. When the solutions are used in the system shown in FIG. 2, the positioning device in the embodiments may be the LMC or a gNB integrated with the LMC in the system shown in FIG. 2, the access network device may be an ng-eNB or gNB, and the terminal device may be UE.

Figure 5:
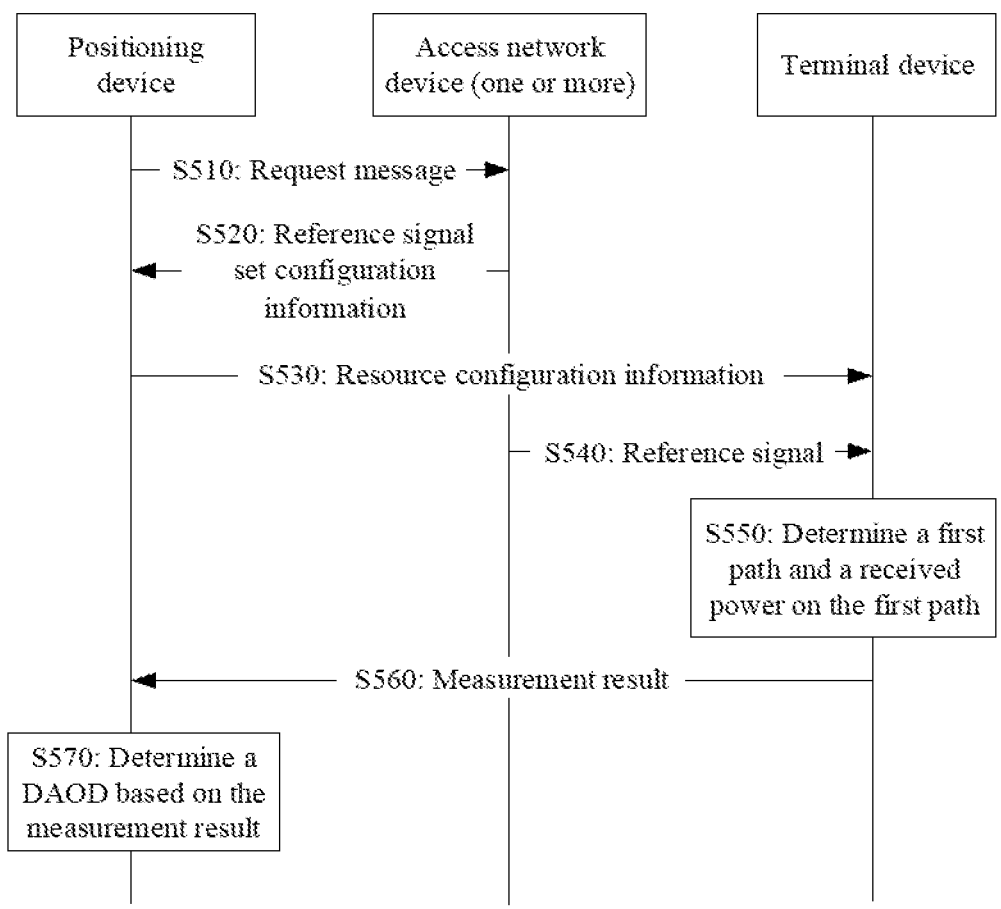
FIG. 5 is a schematic interaction diagram of a signal measurement method according to the embodiments.

FIG. 5 is a schematic flowchart of a signal measurement method 500 shown from a perspective of device interaction. The method 500 shown in FIG. 5 may include step S510 to step S570. The following describes the method 500 in detail with reference to FIG. 5. It should be understood that in FIG. 5, an example in which the method is performed by a positioning device, an access network device, and a terminal device is used only for description. During specific implementation, the positioning device may alternatively be replaced with a chip disposed in the positioning device. Correspondingly, the access network device may alternatively be replaced with a chip disposed in the access network device, and the terminal device may alternatively be replaced with a chip disposed in the terminal device.

S510. The access network device sends a request message to the positioning device. Correspondingly, the positioning device receives the request message sent by the access network device. The request message is used to request reference signal set configuration information.

S520. The access network device sends the reference signal set configuration information to the positioning device. Correspondingly, the positioning device receives the reference signal set configuration information.

For example, a first access network device may send configuration information of a first reference signal set to the positioning device. The configuration information of the first reference signal set is used to configure the first reference signal set. The first reference signal set includes M reference signals, N reference signals in the M reference signals are reference reference signals, M>1, N≥1, and both M and N are integers.

For another example, a second access network device may send configuration information of a second reference signal set to the positioning device. The configuration information of the second reference signal set is used to configure the second reference signal set. The second reference signal set includes P reference signals, Q reference signals in the P reference signals are reference reference signals, P>1, Q≥1, and both P and Q are integers.

It should be understood that the access network device may send the reference signal set configuration information to the positioning device autonomously or may send the reference signal set configuration information based on a request of the positioning device. In other words, S510 is an optional step.

S530. The positioning device sends resource configuration information to the terminal device. Correspondingly, the terminal device receives the resource configuration information sent by the positioning device.

The resource configuration information may include one or more pieces of reference signal set configuration information, and each piece of reference signal set configuration information is used to configure a corresponding reference signal set. In other words, the resource configuration information is used to configure one or more reference signal sets. Each reference signal set may include a plurality of reference signals.

For example, the resource configuration information may include the configuration information of the first reference signal set. For another example, in addition to the configuration information of the first reference signal set, the resource configuration information may further include the configuration information of the second reference signal set. In the embodiments, the reference reference signals may be determined by the access network device, may be determined by the positioning device, or may be determined or selected by the terminal device itself. For example, the N reference reference signals may be determined by the first access network device, may be determined by the positioning device, or may be determined or selected by the terminal device itself. For another example, the Q reference reference signals may be determined by the second access network device, may be determined by the positioning device, or may be determined or selected by the terminal device itself.

When selecting reference reference signals from one reference signal set, the terminal device may select, based on an RSRP corresponding to each reference signal in the reference signal set, one or more reference signals with a largest RSRP as the reference reference signals. Alternatively, the terminal device may select one or more reference signals with a shortest delay as the reference reference signals. Alternatively, the terminal device may select the reference reference signals according to another criterion. This is not limited in the embodiments. In addition, a quantity or a maximum quantity of reference reference signals in one reference signal set may be configured by the positioning device, for example, configured by using the resource configuration information, or may be specified by a protocol or preconfigured.

It should be understood that in addition to the configuration information of the first reference signal set and the configuration information of the second reference signal set, the resource configuration information may further include configuration information of another reference signal set. A quantity of reference signal sets configured in the resource configuration information is not limited in the embodiments. It should be further understood that a quantity of reference signals included in each reference signal set may be or may not be equal, and a quantity of reference reference signals in each reference signal set may be or may not be equal. These are not limited in the embodiments. For example, in the foregoing descriptions, P and M may be or may not be equal, and N and Q may be or may not be equal.

In addition, if the resource configuration information includes a plurality of pieces of reference signal set configuration information, the plurality of pieces of reference signal set configuration information may correspond to different cells. For example, one cell may correspond to one piece of reference signal set configuration information or may correspond to a plurality of pieces of reference signal set configuration information. The cell may be a serving cell or a neighboring cell. This is not limited in the embodiments.

S540. The access network device sends a reference signal to the terminal device. Correspondingly, the terminal device receives the reference signal.

For example, an access network device corresponding to a cell corresponding to each of one or more pieces of reference signal set configuration information included in the resource configuration information sends a corresponding reference signal to the terminal device, and the terminal device receives the reference signal based on the corresponding reference signal set configuration information. For example, if the configuration information of the first reference signal set corresponds to a first cell, the first access network device corresponding to the first cell sends the M reference signals to the terminal device. Correspondingly, the terminal device receives the M reference signals. If the configuration information of the second reference signal set corresponds to a second cell, the second access network device corresponding to the second cell sends the P reference signals to the terminal device. Correspondingly, the terminal device receives the P reference signals.

S550. The terminal device determines a first path corresponding to each reference reference signal, and determines a received power, on the corresponding first path, of each reference signal in a reference signal set to which each reference reference signal belongs.

For example, the terminal device determines N first paths corresponding to the N reference reference signals in the first reference signal set and determines M*N received powers of the M reference signals in the first reference signal set on the N first paths. The terminal device may further determine Q first paths corresponding to the Q reference reference signals in the second reference signal set and determine P*Q received powers of the P reference signals in the second reference signal set on the Q first paths.

It should be understood that a plurality of first paths corresponding to a plurality of reference reference signals in a same reference signal set may be different. However, this is not limited in the embodiments. For example, the N first paths corresponding to the N reference reference signals in the first reference signal set may be different. First paths corresponding to two or more reference reference signals in different reference signal sets may be the same or may be different. This is not limited in the embodiments.

In an implementation, each reference reference signal may correspond to one spatial receive filter. A received power that is of each reference signal in a reference signal set to which any reference reference signal j belongs, that is on a first path j corresponding to a reference reference signal j, and that is determined by the terminal device is: a received power, on the first path j, of each reference signal that is in the reference signal set to which the reference reference signal j belongs and that is received by using a spatial receive filter corresponding to the reference reference signal j.

Using the first reference signal set as an example, the M*N received powers that are of the M reference signals in the first reference signal set on the N first paths and that are determined by the terminal device include: M received powers, on a first path corresponding to each reference reference signal, of the M reference signals received by the terminal device by using a spatial receive filter corresponding to each reference reference signal of the N reference reference signals. M received powers of the M reference signals on any first path j in the N first paths are M received powers, on the first path j, of the M reference signals received by using a spatial receive filter corresponding to a reference reference signal corresponding to the first path j. For example, the N reference reference signals include a reference reference signal #1 and a reference reference signal #2, the reference reference signal #1 corresponds to a spatial receive filter #1 and a first path #1, and the reference reference signal #2 corresponds to a spatial receive filter #2 and a first path #2. The M*N received powers of the M reference signals in the first reference signal set on the N first paths include: M received powers, on the first path #1, of the M reference signals received by the terminal device by using the spatial receive filter #1 and M received powers, on the first path #2, of the M reference signals received by the terminal device by using the spatial receive filter #2.

Further, each of the spatial receive filters is a spatial receive filter that is in a plurality of spatial receive filters and that maximizes a received power of a reference reference signal corresponding to the spatial receive filter. That is, a spatial receive filter corresponding to one reference reference signal is a spatial receive filter that maximizes an RSRP corresponding to the reference reference signal.

For example, the terminal device has a plurality of spatial receive filters, each spatial receive filter corresponds to a different received power when receiving the reference reference signal #1, and the spatial receive filter #1 corresponds to a largest received power when receiving the reference reference signal #1. In this case, the spatial receive filter #1 may be used as a spatial receive filter corresponding to the reference reference signal #1. That is, the spatial receive filter #1 is a spatial receive filter that maximizes an RSRP corresponding to the reference reference signal #1. For another example, each spatial receive filter corresponds to a different received power when receiving the reference reference signal #2, and the spatial receive filter #2 corresponds to a largest received power when receiving the reference reference signal #2. In this case, the spatial receive filter #2 may be used as a spatial receive filter corresponding to the reference reference signal #2. That is, the spatial receive filter #2 is a spatial receive filter that maximizes an RSRP corresponding to the reference reference signal #2.

In an implementation, each first path is a path with a largest received power in a plurality of paths that correspond to a reference reference signal corresponding to the first path. That is, a first path corresponding to one reference reference signal is a path with a largest received power in RSRPs corresponding to the reference reference signal.

For example, the terminal device receives a reference reference signal by using a spatial receive filter corresponding to the reference reference signal. If the reference reference signal corresponds to a plurality of paths, the terminal device determines a received power corresponding to each path. A path corresponding to a largest received power may be determined as a first path corresponding to the reference reference signal.

For example, the reference reference signal #1 includes a line of sight path and a reflection path. The terminal device receives the reference reference signal #1 by using the spatial receive filter #1 corresponding to the reference reference signal #1. If a received power corresponding to the line of sight path is greater than a received power corresponding to the reflection path, the line of sight path may be considered as the first path #1 corresponding to the reference reference signal #1.

It should be understood that the received power in the embodiments may be an RSRP, but this is not limited in the embodiments.

S560. The terminal device reports a measurement result. Correspondingly, the positioning device receives the measurement result.

The measurement result includes some or all of the received powers determined in S550. That is, the measurement result includes received powers, on corresponding first paths, of some or all reference signals in some or all of reference signal sets to which the reference reference signals belong.

For example, if three reference signal sets are configured in the resource configuration information, the measurement result may include only received powers corresponding to some or all reference signals in some reference signal sets in the three reference signal sets. Alternatively, the measurement result may include received powers corresponding to some or all reference signals in the three reference signal sets. For example, the measurement result may include K*N received powers in the M*N received powers of the M reference signals on the N first paths, where K≤M. Moreover, the measurement result may further include some or all of the P*Q received powers of the P reference signals on the Q first paths.

In an implementation, for any reference signal set, the terminal device may report a relatively large received power in a plurality of received powers that are on a corresponding first path and that are of reference signals in the reference signal set. For example, when K<M, the K*N received powers include K largest received powers in the M received powers on each first path in the N first paths. For example, the first reference signal set includes eight reference signals, a reference signal #1 to a reference signal #8, where the reference signal #1 in the eight reference signals is a reference reference signal, and the reference signal #1 corresponds to a first path #1. In this case, if a received power of any reference signal in the reference signal #1 to the reference signal #4 on the first path #1 is greater than a received power of any reference signal in the reference signal #5 to the reference signal #8 on the first path #1, the terminal device may report only received powers of the reference signal #1 to the reference signal #4 on the first path #1.

When reporting the received power, the terminal device may report an absolute received power or a relative received power. The absolute received power is a received power actually measured, and the relative received power is a received power of another reference signal relative to a reference signal determined to be a reference reference signal whose received power is used as a reference. The first reference signal set is used as an example. An absolute received power and a relative received power of a reference signal #i in the first reference signal set are respectively denoted as $P_{1,i}$ and $P_{1,i}'$, where i=1, 2, . . . , and M. In this case, it may be considered that $$P'_{1,1} = 1, P'_{1,k} = \frac{P_{1,k}}{P_{1,1}}, \text{ or } P'_{1,k} = 10 \times \log_{10}\frac{P_{1,k}}{P_{1,1}},$$

where k=2, 3, . . . , and M. $P_{1,1}'$ may not be reported, but this is not limited in the embodiments.

It should be understood that, unless otherwise specified, the received power in the embodiments may be an absolute received power. It should be further understood that the received power of the reference signal in the embodiments may be an RSRP of the reference signal.

In an implementation, if the terminal device reports received powers of some reference signals in a reference signal set on a corresponding first path, the terminal device may further report identifiers of the reference signals.

In an implementation, if one reference signal set includes a plurality of reference reference signals corresponding to a plurality of different first paths, the terminal device may further report a delay difference between the plurality of first paths. For example, the terminal device may select a smallest delay in delays corresponding to the plurality of first paths as a reference value, and report a difference between another delay and the reference value. For another example, the terminal device may alternatively select a delay on a first path corresponding to a specific reference reference signal as a reference and report a difference between another delay and the reference value.

In an implementation, the measurement result may further include identification information of a spatial receive filter corresponding to each reference reference signal.

S570. The positioning device determines a DAOD based on the measurement result.

In an implementation, the positioning device obtains in advance RSRPs that correspond to a plurality of beams at different exit angles and that are measured by each access network device in advance under a relatively ideal condition. The DAOD may be determined by matching the measurement result reported by the terminal device with the RSRPs that correspond to the plurality of beams at the different exit angles and that are measured under the relatively ideal condition.

In another implementation, the positioning device may send a corresponding measurement result to each access network device. For example, the positioning device may send the K*N received powers to the first access network device, and the first access network device may determine the DAOD based on the K*N received powers. For example, the first access network device may determine the DAOD based on the K*N received powers and the RSRPs that correspond to the plurality of beams at the different exit angles and that are measured in advance under the relatively ideal condition.

Moreover, after determining the DAOD, the access network device may further send, to the positioning device, information indicating the DAOD. For example, the first access network device may send, to the positioning device, information indicating the DAOD determined by the first access network device, so that the positioning device may determine the DAOD. According to the signal measurement method provided in the embodiments, the terminal device reports received powers on a same path, so that the positioning device can obtain a more accurate DAOD based on the received powers on the same path. For example, the positioning device may match the received powers on the same path that are reported by the terminal device, with RSRPs that correspond to a plurality of beams at different exit angles and that are measured in advance by an access network device under a relatively ideal condition. Because under the relatively ideal condition, multipath generally does not exist, a matching result is more accurate, so that the positioning device can obtain a more accurate DAOD.

In addition, the terminal device may further report the delay difference between the plurality of paths, so that the positioning device can locate the terminal device based on the DAOD, received powers corresponding to the plurality of paths, and the delay difference.

Figure 6:
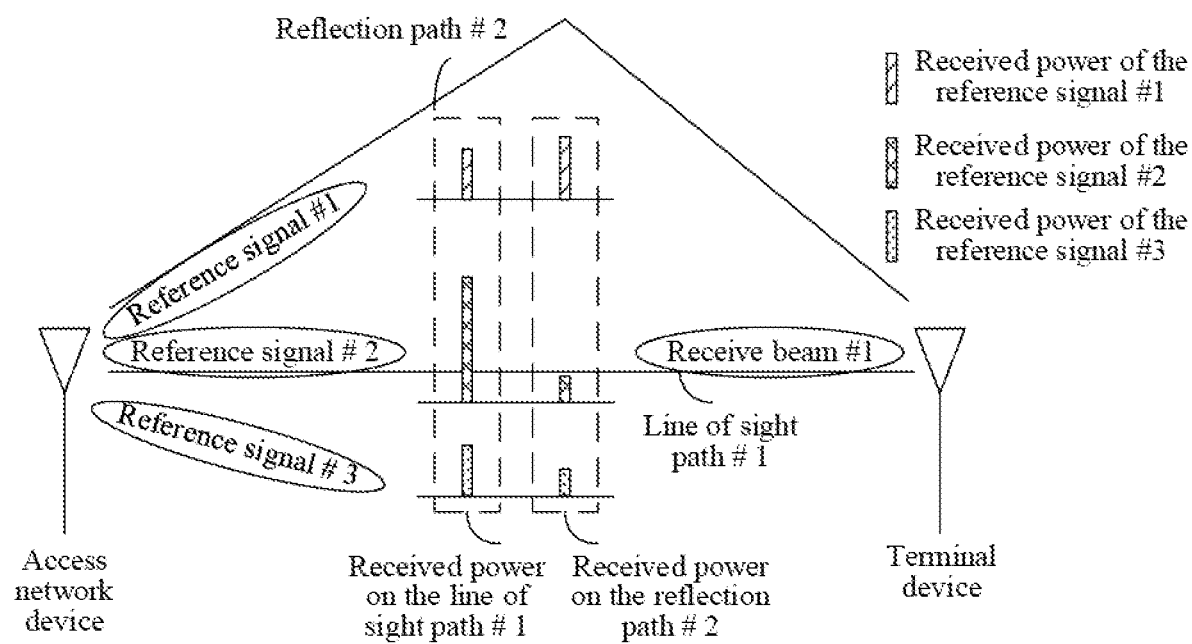
FIG. 6 is an example of a signal measurement method according to the embodiments.
Figure 7:
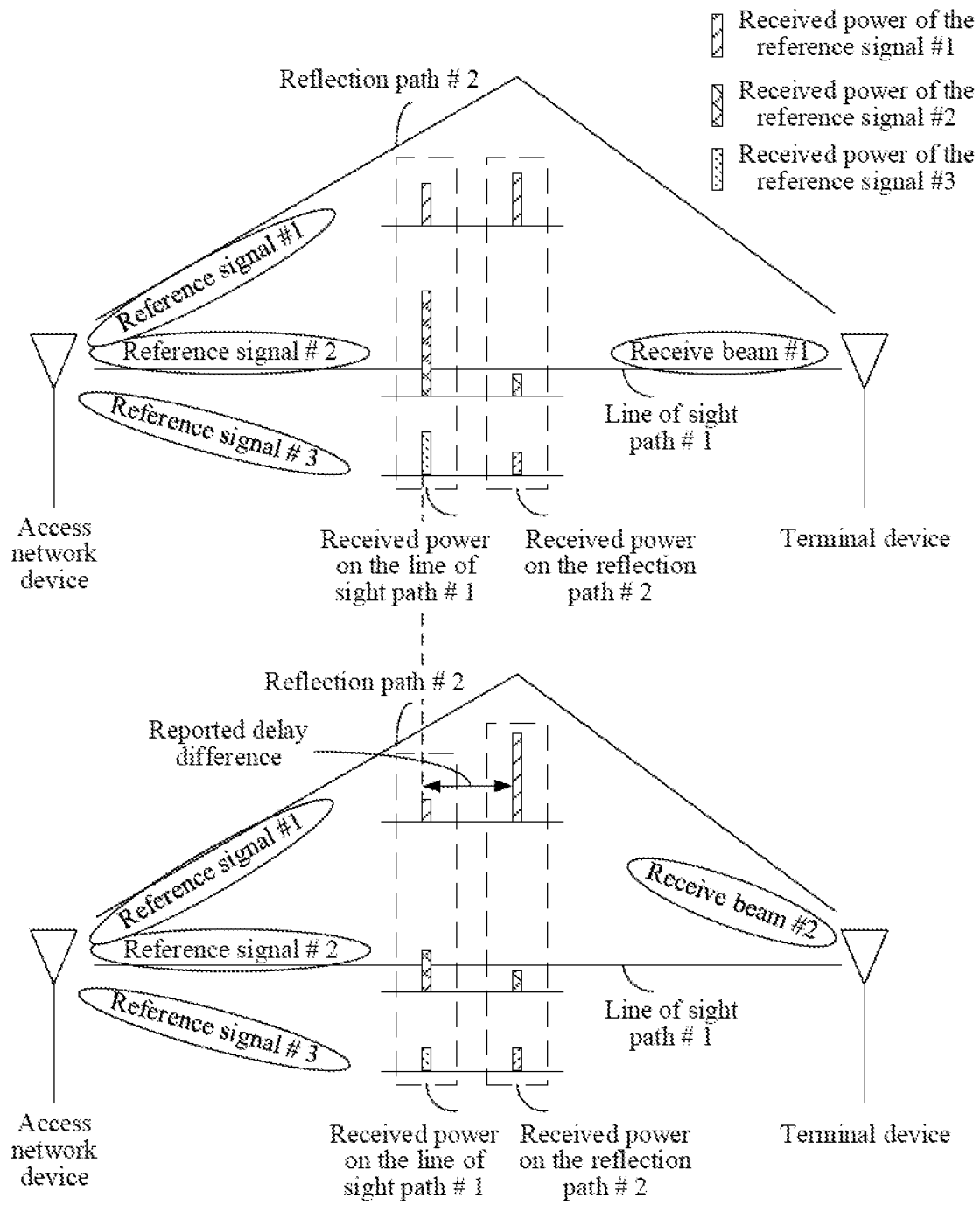
FIG. 7 is another example of a signal measurement method according to the embodiments.

With reference to FIG. 6 and FIG. 7, the following describes in detail two specific examples of the signal measurement method provided in the embodiments.

FIG. 6 is a schematic diagram of received powers on different paths corresponding to different reference signals. Referring to FIG. 6, the access network device sends three reference signals: a reference signal #1, a reference signal #2, and a reference signal #3, where the reference signal #2 is a reference reference signal. It should be understood that the reference signal #1, the reference signal #2, and the reference signal #3 may be a plurality of reference signals in a same reference signal set, for example, may be three reference signals in the first reference signal set. In other words, the first reference signal set corresponds to the access network device. A plurality of paths corresponding to the reference signals include a line of sight path #1 and a reflection path #2 shown in the figure. It should be understood that the reference signals may further include more paths. Herein, only two paths are used as an example for description, and this does not constitute any limitation on the embodiments. On a terminal device side, the terminal device receives the reference signal #1, the reference signal #2, and the reference signal #3 by using a receive beam #1. The receive beam #1 may be a receive beam that maximizes a received power of the reference signal #2 in a plurality of receive beams of the terminal device. It can be understood that, in received powers corresponding to the line of sight path #1 and the reflection path #2, the received power of the reference signal #2 on the line of sight path #1 is greater than received power on the reflection path #2. Therefore, the terminal device may report the received powers of the reference signal #1, the reference signal #2, and the reference signal #3 on the line of sight path #1. The received powers of the reference signal #1, the reference signal #2, and the reference signal #3 on the line of sight path #1 are used to determine a DAOD between the access network device and the terminal device. For the specific determining method, refer to the foregoing description. Details are not described herein again.

FIG. 7 is a schematic diagram of received powers on different paths corresponding to different reference signals. In FIG. 7, a reference signal #1 and a reference signal #2 are used as reference reference signals. The upper figure in FIG. 7 is the same as FIG. 6. For details, refer to the description of FIG. 6. Details are not described herein again. The lower figure in FIG. 7 is a schematic diagram in which the terminal device receives reference signals by using a reference signal #1 as a reference reference signal. Referring to the lower figure in FIG. 7, the terminal device receives the reference signal #1, a reference signal #2, and a reference signal #3 by using a receive beam #2. The receive beam #2 may be a receive beam that maximizes a received power of the reference signal #1 in a plurality of receive beams of the terminal device. It can be understood that, in received powers corresponding to the line of sight path #1 and the reflection path #2, the received power of the reference signal #1 on the reflection path #2 is greater than the received power on the line of sight path #1. Therefore, in addition to reporting the received powers of the reference signal #1, the reference signal #2, and the reference signal #3 on the line of sight path #1, the terminal device may further report the received powers of the reference signal #1, the reference signal #2, and the reference signal #3 on the reflection path #2. In addition, the terminal device may further report a delay difference between the line of sight path #1 and the reflection path #2. The received powers of the reference signal #1, the reference signal #2, and the reference signal #3 on the line of sight path #1 and the received power of the reference signal #1, the reference signal #2, and the reference signal #3 on the reflection path #2 may be used to determine a DAOD between the access network device and the terminal device. For the specific determining method, refer to the foregoing description. Details are not described herein again. In addition, with reference to the delay difference between the line of sight path #1 and the reflection path #2, DAOD-based terminal device positioning may be further performed.

It should be noted that, in FIG. 7, the received powers of the reference signal #1, the reference signal #2, and the reference signal #3 on the line of sight path #1 are obtained by measuring the reference signals received by the receive beam #1. The received powers of the reference signal #1, the reference signal #2, and the reference signal #3 on the reflection path #2 are obtained by measuring the reference signals received by using the receive beam #2.

The embodiments may be independent solutions, or may be combined based on internal logic. These solutions all fall within the protection scope of the embodiments.

The foregoing describes method embodiments, and the following describes apparatus embodiments. It should be understood that descriptions of the apparatus embodiments mutually correspond to the descriptions of the method embodiments. Therefore, for content that is not described in detail, refer to the foregoing method embodiments. For brevity, details are not described herein again.

The foregoing describes the solutions provided in the embodiments from a perspective of interaction between network elements. It may be understood that, to implement the foregoing function, each network element, such as the positioning device or the terminal device, includes a corresponding hardware structure and/or software module for performing each function. A person skilled in the art may be aware that units and algorithm steps in the examples described with reference to the embodiments may be implemented by hardware or a combination of computer software and hardware. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

In this embodiment of the embodiments, the positioning device or the terminal device may be divided into function modules based on the foregoing method examples. For example, function modules may be obtained through division based on corresponding functions, or two or more functions may be integrated into one processing module. The foregoing integrated module may be implemented in a form of hardware or may be implemented in a form of a software function module. It should be noted that, in the embodiments, division into the modules is an example, and is merely logical function division. In actual implementation, another division manner may be used. An example in which functional modules are obtained through division based on functions is used below for description.

Figure 8:
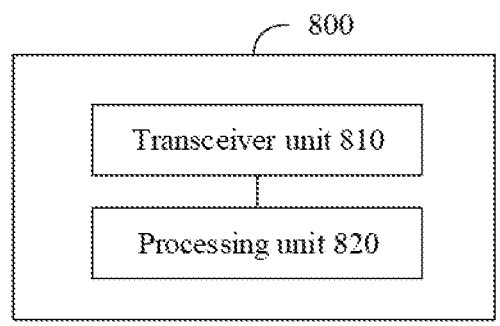
FIG. 8 is a schematic block diagram of a communication apparatus according to the embodiments.

FIG. 8 is a schematic block diagram of a communication apparatus 800 according to an embodiment of the embodiments. The communication apparatus 800 includes a transceiver unit 810 and a processing unit 820. The transceiver unit 810 may communicate with the outside, and the processing unit 820 is configured to process data. The transceiver unit 810 may also be referred to as a communication interface or a communication unit.

The communication apparatus 800 may be configured to perform an action performed by the terminal device in the foregoing method embodiments, or the communication apparatus 800 may be configured to perform an action performed by the positioning device in the foregoing method embodiments.

In an implementation, the communication apparatus 800 may be configured to perform an action performed by the terminal device in the foregoing method embodiments. In this case, the communication apparatus 800 may be referred to as the terminal device. The transceiver unit 810 is configured to perform a sending/receiving-related operation on the terminal device side in the foregoing method embodiments, and the processing unit 820 is configured to perform a processing-related operation of the terminal device in the foregoing method embodiments.

In this implementation, the transceiver unit 810 is configured to: receive resource configuration information, where the resource configuration information includes configuration information of a first reference signal set, the first reference signal set includes M reference signals, N reference signals in the M reference signals are reference reference signals, M is an integer greater than 1, and N is an integer greater than or equal to 1; and receive the M reference signals. The processing unit 820 is configured to: determine N first paths corresponding to the N reference reference signals and determine M*N received powers of the M reference signals on the N first paths. The transceiver unit 810 is further configured to report a measurement result, where the measurement result includes K*N received powers in the M*N received powers, and K≤M.

Therefore, according to the method provided in the embodiments, received powers on a same path are reported, so that the positioning device can obtain a more accurate DAOD based on the received powers on the same path. For example, the positioning device may match the received powers on the same path that are reported by the terminal device, with RSRPs that correspond to a plurality of beams at different exit angles and that are measured in advance by an access network device under a relatively ideal condition. Because under the relatively ideal condition, multipath generally does not exist, a matching result is more accurate, so that the positioning device can obtain a more accurate DAOD.

Optionally, in some embodiments, the N reference reference signals correspond to N spatial receive filters.

M received powers of the M reference signals on any first path j in the N first paths are M received powers, on the first path j, of the M reference signals received by using a spatial receive filter corresponding to a reference reference signal corresponding to the first path j.

Optionally, in some embodiments, the K*N received powers include K largest received powers in M received powers on each first path in the N first paths, and K<M.

Optionally, in some embodiments, the measurement result further includes identification information of K*N reference signals corresponding to the K*N received powers.

Optionally, in some embodiments, the resource configuration information further includes configuration information of a second reference signal set, the second reference signal set includes P reference signals, Q reference signals in the P reference signals are reference reference signals, P is an integer greater than 1, and Q is an integer greater than or equal to 1;

the measurement result further includes some or all of P*Q received powers;

the transceiver unit 810 is further configured to receive the P reference signals; and the processing unit is further configured to: determine Q first paths corresponding to the Q reference reference signals and determine the P*Q received powers of the P reference signals on the Q first paths.

Optionally, in some embodiments, each of the spatial receive filters is a spatial receive filter that is in a plurality of spatial receive filters and that maximizes a received power of a reference reference signal corresponding to the spatial receive filter.

Optionally, in some embodiments, each first path is a path with a largest received power in a plurality of paths that correspond to a reference reference signal corresponding to the first path.

Optionally, in some embodiments, the measurement result further includes delays of N−1 first paths, in the N first paths except a reference first path, relative to the reference first path, where N is greater than 1.

Optionally, in some embodiments, the measurement result further includes identification information of the N spatial receive filters.

In another implementation, the communication apparatus 800 may be configured to perform an action performed by the positioning device in the foregoing method embodiments. In this case, the communication apparatus 800 may be referred to as the positioning device. The transceiver unit 810 is configured to perform a sending/receiving-related operation on the positioning device side in the foregoing method embodiments, and the processing unit 820 is configured to perform a processing-related operation of the positioning device in the foregoing method embodiments.

In this implementation, the transceiver unit 810 is configured to: receive resource configuration information, where the resource configuration information includes configuration information of a first reference signal set, the first reference signal set includes M reference signals, N reference signals in the M reference signals are reference reference signals, M is an integer greater than 1, and N is an integer greater than or equal to 1; and receive the measurement result, where the measurement result includes K*N received powers in M*N received powers of the M reference signals on N first paths, the N first paths correspond to the N reference reference signals, and K≤M. The processing unit 820 is configured to determine a downlink angle of departure (DAOD) based on the measurement result.

Therefore, according to the method provided in the embodiments, the terminal device reports received powers on a same path, the positioning device can obtain a more accurate DAOD based on the received powers on the same path. For example, the positioning device may match the received powers on the same path that are reported by the terminal device, with RSRPs that correspond to a plurality of beams at different exit angles and that are measured in advance by an access network device under a relatively ideal condition. Because under the relatively ideal condition, multipath generally does not exist, a matching result is more accurate, so that the positioning device can obtain a more accurate DAOD.

Optionally, in some embodiments, the N reference reference signals correspond to N spatial receive filters.

M received powers of the M reference signals on any first path j in the N first paths are M received powers, on the first path j, of the M reference signals received by using a spatial receive filter corresponding to a reference reference signal corresponding to the first path j.

Optionally, in some embodiments, the K*N received powers include K largest received powers in M received powers on each first path in the N first paths, and K<M.

Optionally, in some embodiments, the measurement result further includes identification information of K reference signals corresponding to the K*N received powers.

Optionally, in some embodiments, the resource configuration information further includes configuration information of a second reference signal set, the second reference signal set includes P reference signals, Q reference signals in the P reference signals are reference reference signals, P is an integer greater than 1, and Q is an integer greater than or equal to 1; and the measurement result further includes some or all of P*Q received powers of the P reference signals on Q first paths, and the Q first paths correspond to the Q reference reference signals.

Optionally, in some embodiments, each of the spatial receive filters is a spatial receive filter that is in a plurality of spatial receive filters and that maximizes a received power of a reference reference signal corresponding to the spatial receive filter.

Optionally, in some embodiments, each first path is a path with a largest received power in a plurality of paths that correspond to a reference reference signal corresponding to the first path.

Optionally, in some embodiments, the measurement result further includes delays of N−1 first paths, in the N first paths except a reference first path, relative to the reference first path, where N is greater than 1.

Optionally, in some embodiments, the measurement result further includes identification information of the N spatial receive filters.

In another implementation, the communication apparatus 800 may be configured to perform an action performed by the access network device in the foregoing method embodiments. In this case, the communication apparatus 800 may be referred to as the access network device. The transceiver unit 810 is configured to perform a sending/receiving-related operation on the access network device side in the foregoing method embodiments, and the processing unit 820 is configured to perform a processing-related operation of the access network device in the foregoing method embodiments.

In this implementation, the transceiver unit 810 is configured to send configuration information of a first reference signal set, where the first reference signal set includes M reference signals, N reference signals in the M reference signals are reference reference signals, M is an integer greater than 1, and N is an integer greater than or equal to 1; and the transceiver unit 810 is further configured to send the M reference signals.

Optionally, in some embodiments, the transceiver unit 810 is further configured to receive a request message.

The transceiver unit 810 is configured to send the configuration information of the first reference signal set based on the request message.

Optionally, in some embodiments, the transceiver unit 810 is further configured to receive K*N received powers in M*N received powers of the M reference signals on N first paths, where the N first paths correspond to the N reference reference signals, and K≤M; and the processing unit 820 is configured to determine a downlink angle of departure (DAOD) based on the K*N received powers.

Optionally, in some embodiments, the transceiver unit 810 is further configured to send information for indicating the DAOD. It should be understood that the processing unit 820 in the foregoing embodiment may be implemented by a processor or a processor-related circuit, and the transceiver unit 810 may be implemented by a transceiver or a transceiver-related circuit.

Figure 9:
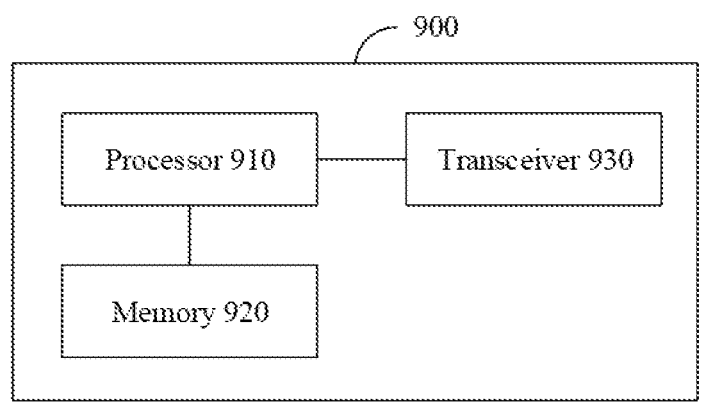
FIG. 9 is another schematic block diagram of a communication apparatus according to the embodiments.

As shown in FIG. 9, an embodiment of the embodiments further provides a communication apparatus 900. The communication apparatus 900 includes a processor 910, a memory 920, and a transceiver 930. The memory 920 stores a program. The processor 910 is configured to execute the program stored in the memory 920. The program stored in the memory 920 is executed, so that the processor 910 is configured to perform related processing steps in the foregoing method embodiment, and the program stored in the memory 920 is executed, so that the processor 910 controls the transceiver 930 to perform related sending and receiving steps in the foregoing method embodiment.

In an implementation, the communication apparatus 900 is configured to perform an action performed by the terminal device in the foregoing method embodiments. In this case, the execution of the program stored in the memory 920 enables the processor 910 to perform processing steps on a terminal device side in the foregoing method embodiments and enables the processor 910 to control the transceiver 930 to perform receiving and sending steps on the terminal device side in the foregoing method embodiments.

In another implementation, the communication apparatus 900 is configured to perform an action performed by the positioning device in the foregoing method embodiments. In this case, the execution of the program stored in the memory 920 enables the processor 910 to perform processing steps on a positioning device side in the foregoing method embodiments and enables the processor 910 to control the transceiver 930 to perform receiving and sending steps on the positioning device side in the foregoing method embodiments.

An embodiment of the embodiments further provides a communication apparatus 1000. The communication apparatus 1000 may be a terminal device or a chip. The communication apparatus 1000 may be configured to perform an action performed by the terminal device in the foregoing method embodiments.

Figure 10:
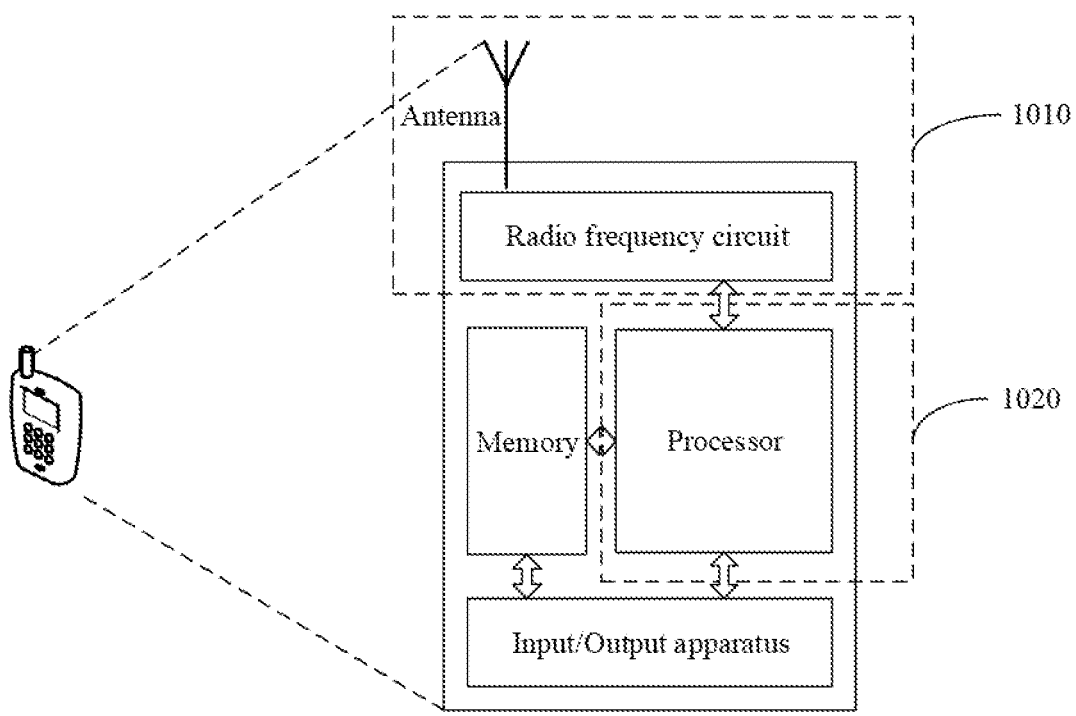
FIG. 10 is a schematic block diagram of a terminal device according to an embodiment of the embodiments.

When the communication apparatus 1000 is a terminal device, FIG. 10 is a simplified schematic structural diagram of the terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is configured to: process a communication protocol and communication data, control the terminal device, execute a software program, process data of the software program, and so on. The memory is configured to store the software program and data. The radio frequency circuit is configured to: perform conversion between a baseband signal and a radio frequency signal and process the radio frequency signal. The antenna is configured to receive and transmit a radio frequency signal in an electromagnetic wave form. The input/output apparatus, such as a touchscreen, a display screen, or a keyboard, is configured to: receive data entered by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor or may be integrated with the processor. This is not limited in the embodiments.

In the embodiments, the antenna and the radio frequency circuit that have receiving and sending functions may be considered as a transceiver unit of the terminal device, and the processor that has a processing function may be considered as a processing unit of the terminal device.

As shown in FIG. 10, the terminal device includes a transceiver unit 1010 and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 1020 is configured to perform S550 in FIG. 5, and/or the processing unit 1020 is further configured to perform another processing step on the terminal device side in this embodiment of the embodiments. The transceiver unit 1010 is further configured to perform S530, S540, and S550 shown in FIG. 5, and/or the transceiver unit 1010 is further configured to perform another transceiver step on the terminal device side.

It should be understood that FIG. 10 is merely an example instead of a limitation. The terminal device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit may be a processor, a microprocessor, or an integrated circuit integrated on the chip.

An embodiment of the embodiments further provides a communication apparatus 1100. The communication apparatus 1100 may be a positioning device or a chip. The communication apparatus 1100 may be configured to perform an action performed by the positioning device in the foregoing method embodiments.

Figure 11:
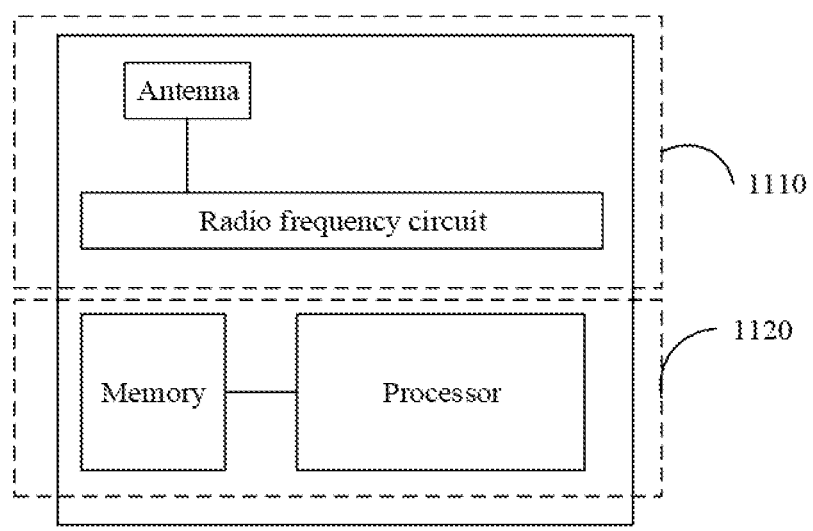
FIG. 11 is a schematic block diagram of a positioning device according to an embodiment of the embodiments.

When the communication apparatus 1100 is a positioning device, for example, the communication apparatus 1100 is a base station integrated with an LMC. FIG. 11 is a simplified schematic structural diagram of the base station. The base station includes a part 1110 and a part 1120. The part 1110 is configured to: send and receive a radio frequency signal and perform conversion between the radio frequency signal and a baseband signal. The part 1120 is configured to: perform baseband processing, control the base station, and so on. The part 1110 may be usually referred to as a transceiver unit, a transceiver machine, a transceiver circuit, a transceiver, or the like. The part 1120 is usually a control center of the base station and may usually be referred to as a processing unit, and is configured to control the base station to perform a processing operation on a positioning device side in the foregoing method embodiments.

The transceiver unit in the part 1110 may also be referred to as a transceiver machine, a transceiver, or the like. The transceiver unit includes an antenna and a radio frequency unit. The radio frequency unit is configured to perform radio frequency processing. Optionally, a component for implementing a receiving function in the part 1110 may be considered as a receiving unit, and a component for implementing a sending function may be considered as a sending unit. That is, the part 1110 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1120 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in part 1110 is configured to perform the sending operation on the positioning device side in S530 in FIG. 5, and the receiving operation on the network positioning device side in S560; and/or the transceiver unit in part 1110 is further configured to perform another transceiver step on the positioning device side in the embodiments. The processing unit in part 1120 is configured to perform the processing operation in S570 in FIG. 5; and/or the processing unit in part 1120 is further configured to perform a processing step on a positioning device side in the embodiments.

It should be understood that FIG. 11 is merely an example instead of a limitation. The positioning device including the transceiver unit and the processing unit may not depend on the structure shown in FIG. 11.

When the communication apparatus 1100 is a chip, the chip includes a transceiver unit and a processing unit. The transceiver unit may be an input/output circuit or a communication interface. The processing unit is a processor, a microprocessor, or an integrated circuit integrated on the chip.

It should be understood that the communication apparatus 1100 may alternatively be an access network device, or a chip corresponding to the access network device. The communication apparatus 1100 may be configured to perform an action performed by the access network device in the foregoing method embodiments. For example, in an implementation, the transceiver unit in part 1110 is configured to perform the sending operation on the access network device side in S520 in FIG. 5.

This embodiment of the embodiments further provides a computer-readable storage medium. The computer-readable storage medium stores a computer program. When the computer program is executed by a computer, the computer is enabled to implement the method on a terminal device side or the method on the positioning device side in the foregoing method embodiments.

This embodiment of the embodiments further provides a computer program product including instructions. When the instructions are executed by a computer, the computer is enabled to implement the method on a terminal device side or the method on the positioning device side in the foregoing method embodiment.

For explanations and beneficial effects of related content of any of the communication apparatuses provided above, refer to the corresponding method embodiment provided above, and details are not described herein again.

In the embodiments, the terminal device or the positioning device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software. In addition, a specific structure of an execution body of a method provided in the embodiments is not limited in the embodiments of, provided that a program that records code of the method provided in the embodiments can be run to perform communication according to the method provided in the embodiments. For example, the execution body of the method provided in the embodiments may be the terminal device or the positioning device, or a function module that can invoke and execute the program and that is in the terminal device or the positioning device.

In addition, each aspect or feature of the embodiments may be implemented as a method, an apparatus or a product that uses standard programming and/or engineering technologies. The term "product" used in the embodiments covers a computer program that can be accessed from any computer-readable component, carrier, or medium. For example, the computer-readable medium may include, but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in the embodiments may indicate one or more devices and/or other machine-readable media that are configured to store information. The term "machine-readable media" may include, but is not limited to, a wireless channel, and various other media that can store, include, and/or carry instructions and/or data.

It should be understood that the processor mentioned in this embodiment of the embodiments may be a central processing unit (CPU), or another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in this embodiment of the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in the embodiments aims to include, but is not limited to, these memories and any memory of another proper type.

It should be understood that an "embodiment" means that particular characteristics, structures, or features related to the embodiment are included in at least one embodiment. Therefore, the embodiments do not necessarily refer to a same embodiment. In addition, these particular features, structures, or characteristics may be combined in one or more embodiments in any appropriate manner. It should be understood that sequence numbers of the foregoing processes do not mean execution sequences in various embodiments. The execution sequences of the processes should be determined based on functions and internal logic of the processes and should not be construed as any limitation on the implementation processes of the embodiments.

It should be further understood that, in the embodiments, "when" and if mean that UE or a base station performs corresponding processing in an objective situation, and are not intended to limit time, and the UE or the base station is not necessarily required to have a determining action during implementation, and do not mean any other limitation.

In addition, the terms "system" and "network" may be used interchangeably in the embodiments. The term "and/or" in the embodiments describes only an association relationship for describing associated objects and represents that there may be three relationships. For example, A and/or B may represent the following three cases: only A exists, both A and B exist, and only B exists.

The term "at least one of . . . " in the embodiments represents all or any combination of the listed items. For example, "at least one of A, B, and C" may represent the following six cases: A exists alone, B exists alone, C exists alone, A and B coexist, B and C coexist, and A, B, and C coexist.

It should be understood that in the embodiments, "B corresponding to A" represents that B is associated with A, and B may be determined based on A. However, it should be further understood that determining B based on A does not mean that B is determined based on only A. B may alternatively be determined based on A and/or other information.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

It may be clearly understood by a person of ordinary skill in the art that, for convenient and brief description, for a detailed working process of the foregoing system, apparatus, and unit, refer to a corresponding process in the foregoing method embodiment. Details are not described herein again.

In the several embodiments provided, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the solutions of the embodiments essentially, or the part contributing to the conventional technology, or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the embodiments, but are non-limiting. Any variation or replacement readily figured out by a person of ordinary skill in the art within the scope disclosed in the embodiments shall fall within the scope of the embodiments.

The invention claimed is:

1. A communications apparatus, comprising:
at least one processor communicably coupled to one or more memories storing programming instructions for execution by the at least one processor to perform operations comprising:
receiving resource configuration information, wherein the resource configuration information comprises configuration information of a first reference signal set, the first reference signal set comprises M reference signals, the M reference signals includes a first reference reference signal, and M is an integer greater than 1;
after receiving the resource configuration information for the M reference signals, receiving the M reference signals;
identifying the first reference reference signal, and, based on an attribute of the first reference reference signal, determining a first path corresponding to the first reference reference signal;

determining M received powers of the M reference signals on the first path; and reporting a measurement result, wherein the measurement result comprises K received powers in the M received powers, and K≤M.

2. The communications apparatus according to claim 1, wherein the first reference reference signal corresponds to a spatial receive filter; and the M received powers of the M reference signals on the first path are M received powers, on the first path, of the M reference signals received by using the spatial receive filter corresponding to the first reference reference signal corresponding to the first path.

3. The communications apparatus according to claim 2, wherein the spatial receive filter is a spatial receive filter that maximizes a received power of the first reference reference signal among multiple spatial receive filters.

4. The communications apparatus according to claim 2, wherein the measurement result further comprises identification information of the spatial receive filter.

5. The communications apparatus according to claim 1, wherein the K received powers are K largest received powers in the M received powers on the first path, and K<M.

6. The communications apparatus according to claim 5, wherein the measurement result further comprises identification information of K reference signals corresponding to the K received powers.

7. The communications apparatus according to claim 1, wherein the resource configuration information further comprises configuration information of a second reference signal set, the second reference signal set comprises P reference signals, the P reference signals includes a second reference reference signal, and P is an integer greater than 1, and the measurement result further comprises some or all of P received powers.

8. A communications apparatus, comprising:
at least one processor communicably coupled to one or more memories storing programming instructions for execution by the at least one processor to perform operations comprising:
sending resource configuration information, wherein the resource configuration information comprises configuration information of a first reference signal set, the first reference signal set comprises M reference signals, the M reference signals includes a first reference reference signal, M is an integer greater than 1;
receiving a measurement result, wherein the measurement result comprises K received powers in M received powers of the M reference signals on the first path, the first path corresponds to the first reference reference signal, and K≤M; and
after receiving the measurement result for the M reference signals on the first path, determining a downlink angle of departure (DAOD) based on the measurement result.

9. The communications apparatus according to claim 8, wherein the first reference reference signal corresponds to a spatial receive filter; and the M received powers of the M reference signals on the first path are M received powers, on the first path, of the M reference signals received by using the spatial receive filter corresponding to the first reference reference signal corresponding to the first path.

10. The communications apparatus according to claim 9, wherein the spatial receive filter is a spatial receive filter that maximizes a received power of the first reference reference signal among multiple spatial receive filters.

11. The communications apparatus according to claim 9, wherein the measurement result further comprises identification information of the spatial receive filter.

12. The communications apparatus according to claim 8, wherein the K received powers are K largest received powers in the M received powers on the first path, and K<M.

13. The communications apparatus according to claim 12, wherein the measurement result further comprises identification information of K reference signals corresponding to the K received powers.

14. The communications apparatus according to claim 8, wherein the resource configuration information further comprises configuration information of a second reference signal set, the second reference signal set comprises P reference signals, the P reference signals includes a second reference reference signal, P is an integer greater than 1;

the measurement result further comprises some or all of P received powers.

15. A signal measurement method, comprising:
sending, by a positioning device, resource configuration information, wherein the resource configuration information comprises configuration information of a first reference signal set, the first reference signal set comprises M reference signals, the M reference signals includes a first reference reference signal, and M is an integer greater than 1;
after sending, by the positioning device, the resource configuration information for the M reference signals, sending, by an access network device, the M reference signals;
receiving, by the positioning device, a measurement result, wherein the measurement result comprises K received powers in M received powers of the M reference signals on the first path, the first path corresponds to the first reference reference signal, and K≤M; and
after receiving, by the positioning device, the measurement result for the M reference signals on the first path, determining, by the positioning device, a downlink angle of departure (DAOD) based on the measurement result.

16. The signal measurement method according to claim 15, further comprising:
receiving, by the access network device, a request message from the positioning device; and
sending, by the access network device, the configuration information of the first reference signal set to the positioning device.

17. The signal measurement method according to claim 15, further comprising:
receiving, by the access network device, the measurement result; and
sending, by the access network device, the measurement result to the positioning device.

18. The signal measurement method according to claim 15, wherein the first reference reference signal corresponds to a spatial receive filter; and the M received powers of the M reference signals on the first path are M received powers, on the first path, of the M reference signals received by using the spatial receive filter corresponding to the first reference reference signal corresponding to the first path.

19. The signal measurement method according to claim 18, wherein the spatial receive filter is a spatial receive filter that maximizes a received power of the first reference reference signal among multiple spatial receive filters.

20. The signal measurement method according to claim 15, wherein the resource configuration information further comprises configuration information of a second reference signal set, the second reference signal set comprises P reference signals, the P reference signals includes a second reference reference signal, and P is an integer greater than 1, the measurement result further comprises some or all of P received powers; and the method further comprises:

receiving the P reference signals; and determining a second path corresponding to the second reference reference signal, and determining the P received powers of the P reference signals on the second path.

* * * * *